United States Patent
Fetzer et al.

(10) Patent No.: US 6,707,831 B1
(45) Date of Patent: Mar. 16, 2004

(54) MECHANISM FOR DATA FORWARDING

(75) Inventors: Eric S Fetzer, Longmont, CO (US);
Rohit Bhatia, Fort Collins, CO (US);
Mark Gibson, Timnath, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/510,278

(22) Filed: Feb. 21, 2000

(51) Int. Cl.$^7$ .................................................. H04J 3/02
(52) U.S. Cl. ...................... 370/537; 370/531; 370/414; 710/20; 710/36; 712/11; 326/86; 326/105
(58) Field of Search ................................ 370/360, 385, 370/386, 522, 532, 537, 538, 540, 531, 414, 416, 418; 712/4, 5, 10, 11, 20, 21, 22, 218, 221, 222, 242, 243; 326/38, 41, 47, 105, 86, 93, 95, 98; 710/20, 21, 22, 23, 25, 36, 51

(56) References Cited

U.S. PATENT DOCUMENTS

| | | | | |
|---|---|---|---|---|
| 4,450,525 A | * | 5/1984 | Demuth et al. | 712/243 |
| 4,706,240 A | * | 11/1987 | Payne, III | 370/60 |
| 5,043,606 A | * | 8/1991 | Lewis | 307/475 |
| 5,253,308 A | * | 10/1993 | Johnson | 382/49 |
| 5,481,495 A | * | 1/1996 | Henkels et al. | 365/189.02 |
| 6,118,300 A | * | 9/2000 | Wittig et al. | 326/41 |
| 6,215,325 B1 | * | 4/2001 | Southard | 326/38 |

FOREIGN PATENT DOCUMENTS

| | | | | |
|---|---|---|---|---|
| DE | | 4107172 C2 | 9/1992 | G01R/31/28 |
| WO | | WO 95/09394 | 4/1995 | G06F/9/38 |

OTHER PUBLICATIONS

Translation into English of German Office Action, dated Jan. 29, 2002.
Search Report dated Jan. 29, 2002 in counterpart German Application No. 10059484.0–53.

* cited by examiner

Primary Examiner—Dang Ton
Assistant Examiner—Shick Hom

(57) ABSTRACT

A system and method are disclosed which allow unstored computed results to be accessed without the normal overhead associated with traditional data forwarding and bypass techniques. Through the use of multiplexers and bi-directional OR controllers the unstored data is readily accessible for use before it is stored in a register file. The circuitry used also allows bi-directional travel across a register file or bank as information is passed between the bi directional controllers used. Latches can also be used in the circuitry. Additionally, the features of the invention allow the required number of select signals fed to the multiplexers used to be reduced over conventional methods. These reductions are possible through circuitry disclosed herein.

15 Claims, 4 Drawing Sheets

MECHANISM FOR DATA FORWARDING

BACKGROUND

Faster performance is achieved with current microprocessor technologies through the use of instruction pipelines for retrieving and executing program instructions. One obstacle to pipelining microprocessors is that computed results are not immediately written back into a register file, requiring multiple clock cycles for the computed result to be moved to, and stored into, the appropriate register file. Processing delays may result if the computed results are needed before they are placed into, and become available from, the register file. This delay problem may have a "domino effect" during each of the cycles in which the computed result is not stored in a register file while additional computed results become available and are needed before they, in turn, are recorded in the register file.

In the past, the data availability delay problem has been addressed through the use of data forwarding and/or bypass techniques. Both data forwarding and bypass techniques allow arithmetic logic units (ALUs), or ALU execution units, to access and use the computed results before they are placed in the register file. By allowing these results to be used before they are placed in the register file the machine is used more efficiently and its performance is increased.

Conventional data forwarding and bypass techniques use multiplexers (MUXs) to allow unstored computed results to be available for subsequent use. Access to computed results from several computational cycles not yet in a register file is provided by multiple layers, or a hierarchy, of MUXs. In order to provide access to all of the computed results before reading the register file, the data forwarding or bypass circuitry is repeated numerous times, increasing the complexity of the overall circuit. The complexity of the system is also increased as data forwarding is used for additional ALUs or as data forwarding is used for additional ALU inputs. Use of a MUX hierarchy can provide a capability in which every computed result from each ALU can be bypassed to every other ALU in one cycle or one machine state. When this is achieved, a complete bypass network is obtained.

To provide these capabilities, each data forwarding or bypass circuit requires one or more MUXs. Dynamic circuits are typically used to ensure that the right MUX output is selected, at the fastest possible speed. Dynamic circuits are monotonic signalling. For each input of to a dynamic circuit MUX, a corresponding separate discrete MUX select signal is required so as to avoid select signal decoding delays. Therefore, for a dynamic MUX, the number of inputs on a MUX is equal to the number of selects on the MUX. For a dynamic MUX which has N inputs, N selects would also be required resulting in at least 2N connections to the MUX. Connections are also required for the output and clock resulting in 2N+2 connections to the MUX.

While the use of data forwarding and bypass techniques provide high performance circuit operation, they have several drawbacks. These drawbacks fall into three categories: circuit performance, area required by the circuitry and circuit and wiring complexity. In particular, within a circuit, as the need for data forwarding and bypass techniques increases and is addressed with the techniques described, the overall performance of the circuit is reduced and both the area used for data forwarding/bypass and the resulting circuit and wiring complexity is increased. To alleviate these drawbacks, designers have concentrated on removing unnecessary bypasses, i.e., those that don't result in valuable performance gain.

Conventional data MUXs, typically comprising a select control switch, involve a dynamic clock activated circuit. This means that the result output is only valid when the clock signal is asserted. When the clock signal is not asserted the result goes to a precharged or a predetermined state, and does not necessarily reflect the circuit's state. When a select signal is asserted the output will reflect the value of data corresponding to the high select signal. The select signals are guaranteed by design to be mutually exclusive allowing only one of the data values to be transmitted to the output. In a standard dynamic circuit style, this MUX output circuit would include an inverter circuit followed by a feedback hold circuit.

SUMMARY OF THE INVENTION

An object of the invention is to provide a methodology that allows access to computed results which are not available in a register file, without the associated drawbacks.

A further object of the invention is to provide a data forwarding architecture which reduces the number of wires used. A further object of the invention is the use of less area for data forwarding. A further object of the invention is to reduce circuit complexity. A further object of the invention is to allow increased data forwarding capability. These objectives are accomplished through the use of encoded wires and the reuse of data path multiple times to achieve different functions.

According to a feature of the invention, a bypass is established through the reuse of the register file input wires without the need for any additional wires. The speed of the bypass is also increased over a standard MUX hierarchy because the MUXs used in the invention are of a smaller size, and therefore faster. Less area is required by virtue of smaller MUXs and through a reduction in the number of MUXs used. The use of fewer wires and smaller components: simplifies the circuit design and its complexity and allows for less onerous debugging of the circuitry. MUX control circuitry is also simplified because exclusivity in the select lines is no longer required. These and similar features allow simpler control mechanisms. Additionally, through higher capacity, this invention reduces the latency of particular bypasses.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

Figure 1:
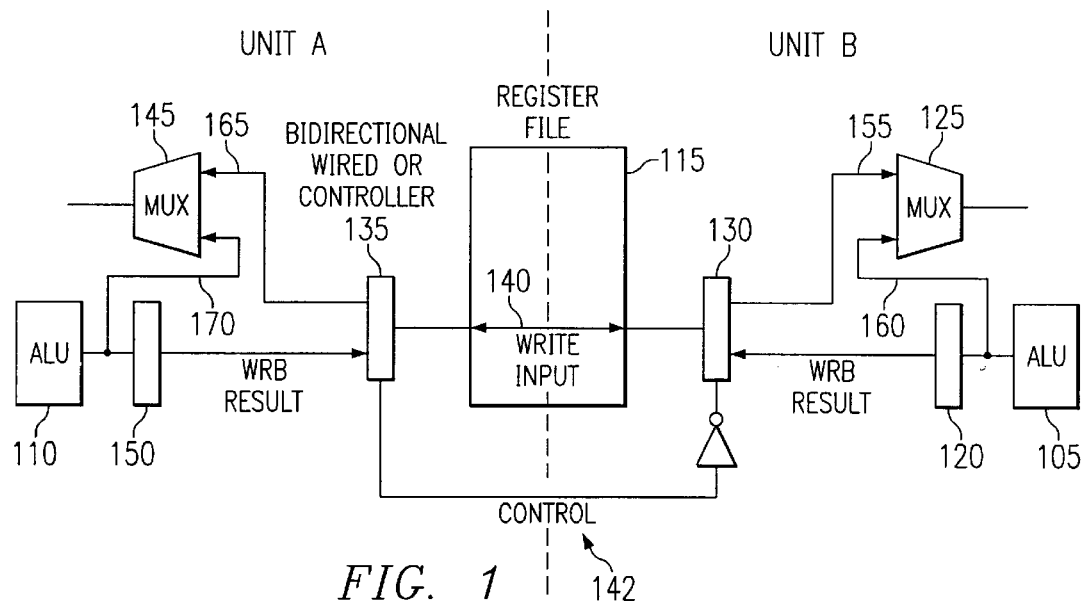
FIG. 1 shows a block diagram of a preferred embodiment for a mechanism for a data forwarding circuit.

FIG. 1 shows a new implementation of data forwarding with a write back (WRB) stage bypass. Note that the main CPU core pipeline comprises the REG stage (register read), the EXE stage (execute) wherein operations are performed, the DET Stage (detect) wherein exceptions are detected, and the WRB stage (write-back) wherein results are committed to architected state. Note that the invention will operate with other pipelines, as this pipeline is one example. It has an ALU 105, 110 on either side of the register file 115. Connecting the register file 115 in the middle of the ALUs of functional units optimizes the configuration. Throughout this description the term ALU is used. Those of ordinary skill in the art will understand that other functional units are equivalent to the described ALU's for the purpose of this invention.

Within unit B of FIG. 1, unit B's ALU 105's output goes to both unit B's latch 120 and to unit B's MUX 125. The output from unit B's latch 120 goes to unit B's bi-directional wired OR controller 130. The output of unit B's bi-directional wired OR controller 130, goes to unit B's MUX 125 and to a path 140 in the register file 115.

In FIG. 1, both unit B's ALU 105 and unit A's ALU 110 results are destined to the register file 115 and the architecture, allows either unit B's ALU 105 or unit A's ALU 110 results to be written into the register file 115 in a given cycle, while preventing both from being written simultaneously. Therefore, when directed by control 142 the output of unit B's bi-directional wired OR controller 130, goes into the register file 115, goes across the register file 115 on the path 140 into unit A's bi-directional wire OR controller 135, and through that into unit A's MUX 145.

FIG. 1 shows that this works in both directions. Computed results can travel from unit A to unit B as follows: unit A's ALU 110 to both unit A's MUX 145 and unit A's latch 150, from unit A's latch 150 to unit A's bi-directional wired OR controller 135 to unit A's MUX 145, and from unit A's bi-directional wired OR controller 135 to path 140 in register file 115 to unit B's bi-directional wired OR controller 130 to unit B's MUX 125. Computed results can also travel from unit B to unit A as follows: unit B's ALU 105 to both unit B's MUX 125 and unit B's latch 120, from unit B's latch 120 to unit B's bi-directional wired OR controller 130 to unit B's MUX 125, and from unit B's bi-directional wired OR controller 130 to path 140 of register 115 to unit A's bi-directional wired OR controller 135 to unit A's MUX 145. Path 140, which traverses across the register file 115 is bi-directional and performs two tasks. Path 140 is used to write the computed value into the register file 115, and it is also used to allow computed results to be passed between units A and B in either direction. In unit A the computed result from unit B is sent to unit A's MUX 145, and in unit B the computed result from unit A is sent to unit B's MUX 125. The MUXs 125, 145 on either side of the register file 115 are symbolic of the data forwarding circuitry to get back to the ALU, shown in FIG. 3. FIG. 1 also shows two inputs to unit B's MUX 125 and two inputs to unit A's MUX 145. For unit B's MUX 125 the two inputs are a write back minus 1 (WRB−1) input 155 and a WRB result input 160 for each ALU. Similarly, for unit A's MUX 145 there is a WRB−1 input 165 and a WRB result input 170 for each ALU. Again, unit B's MUX 125 and unit A's MUX 145 are symbolic of the data forwarding circuitry to allow unstored computed results to be available to the ALUs.

It normally takes several cycles for the ALU data to be written back into the register file. Once the ALU data is written into the register file it becomes available to other ALUs from the register file. During each of the subsequent cycles the ALU may calculate additional results. Each of these additional results needs to be available to other ALUs until they, in turn, are stored in a register file. EXE stage data is the fresher data than DET or WRB stage data, it represents data that has just been computed by the ALU during the last completed cycle. WRB−1 represents the computed results of the previous ALU cycle. Note that this stage corresponds to the DET pipeline stage. WRB represents the computed results of the ALU two cycles ago. Accordingly, WRB data will be placed in a register file one cycle before WRB−1 data will be recorded in a register file. Similarly, WRB data will be placed in a register file two cycles before EXE data will be recorded in a register file. While this example describes a system in which the ALU result is recorded into a register file three cycles after it has been calculated, one of ordinary skill in the art will recognize that this mechanism for data forwarding and bypass can be expanded to encompass any delay in recording the data in the register file.

Figure 2:
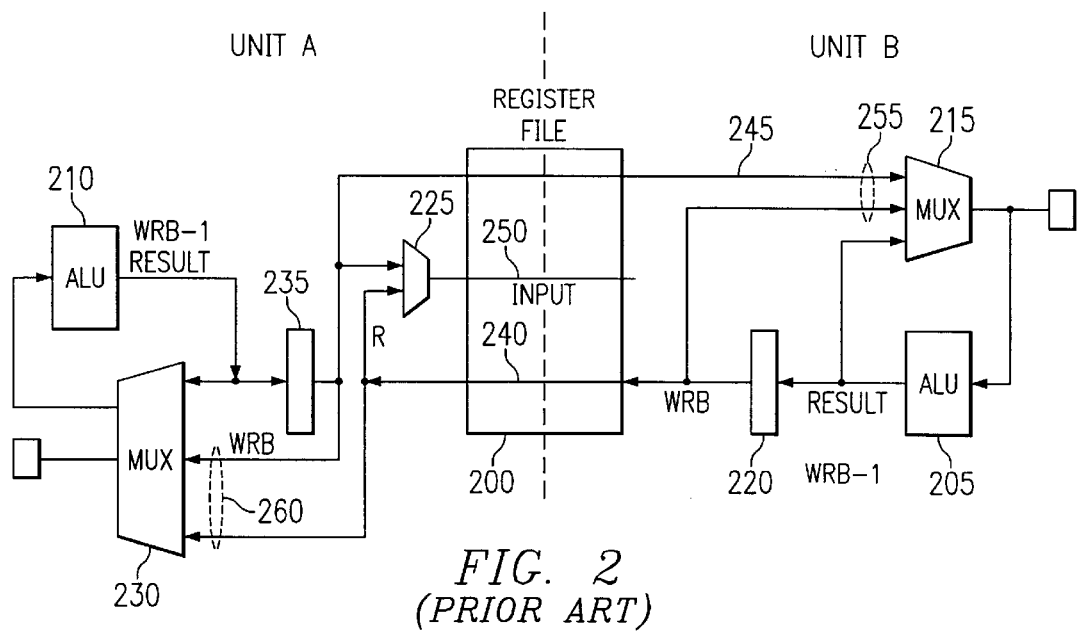
FIG. 2 shows a block diagram of a prior art implementation of data forwarding circuitry.

FIG. 2 shows an example of a conventional arrangement used for data forwarding. Register file 200 is connected between unit B's ALU 205 and unit A's ALU 210. A data output from unit B's ALU 205 is fed to both unit B's MUX 215 and unit B's latch 220. The output from unit B's latch 220 is connected to unit B's MUX 215, MUX 225, and unit A's MUX 230. Similarly, the output from unit A's ALU 210 is connected to unit A's latch 235 and unit A's MUX 230. The output from unit A's latch 235 is connected to unit A's MUX 230, MUX 225 and unit B's MUX 215.

Three data paths are shown traversing the register file 200. A first path 240 provides the output of unit B's latch 220 from unit B's ALU 205 to unit A. The second connection 245 provides the output of unit A's latch 235 from unit A's ALU 210 result to unit B. The third path 250 allows the output of unit B's latch 220 to be MUX'ed with the output of unit A's latch 235 in MUX 225 and is used to drive the input to the register file 200. This configuration has three paths, 240, 245, 250, traversing across the register file 200. The buses are also directional. Besides the three paths 240, 245, 250 being required in the register file 200 (which costs precious area) there is also a third MUX 225 required to multiplex the results from unit A's ALU 210 and unit B's ALU 205 into the register file 200. In this configuration, unit B's MUX 215 and unit A's MUX 230 each have three inputs which includes two write back (WRB) results, one set 255 from unit A and one set 260 from unit B.

The embodiment illustrated in FIG. 1 is advantageous when compared to the circuitry illustrated in FIG. 2 for several reasons. In FIG. 2 there are three paths 240, 245, 250 traversing the register file 200, as compared to the single path 140 traversing the register file 115 shown in FIG. 1. In FIG. 2, the paths are directional, while in FIG. 1 the path 140 is bidirectional. In FIG. 2, both unit B's MUX 215 and unit A's MUX 230 each have three inputs, while FIG. 1's unit B's MUX 125 and unit A's MUX 145 each have two inputs. Each of these extra paths and wires, two paths within the register file and one input wire to each of the MUXs take up extra area. Additionally, in FIG. 2, and extra MUX 225 is required to multiplex the results from the unit A's ALU 210 and unit B's ALU 205 into the register file 200. This third MUX 125, also takes up valuable area.

In FIG. 1 the ALU result is staged to WRB stage, which is the stage where the data is written into the register file. The data then passes into this bi-directional wired OR controller, which determines whether this ALU's result is valid for writing into the register file. If it is, the wired OR controller drives it into the register file and across the register file, into the other wire OR controller, which forwards it on to the MUX or data forwarding hierarchy, which continues on to the source latch for the ALU on the other side. This can go in either direction. The bi-directional wire OR controller requires a control input which is easy to determine in this architecture, several cycles in advance to determine whether the data is flowing from unit A to unit B or from unit B to unit A.

FIG. 1 can be expanded in a couple of different ways. In more complicated architectures, multiple ALUs on either side of the register file can be added. The addition of these extra ALUs means there will be many more results going across to the register file, one for each ALU on each side. This diagram can also be expanded with the use of multiple sides. While FIG. 1, depicts a unit A and a unit B, one skilled in the art will appreciate that the diagram could be expanded to include additional units. The inclusion of these additional units would increase the control mechanism 142, but will not require additional data forwarding or bypass circuitry to be added. The number of ALUs that can write into the register file at a time determines the number of paths required across the register file. FIG. 1 shows two ALUs with a single path 140 across the register file 115. If two ALUs were included on both sides of the figure, two paths would traverse across the register file to allow two ALUs to write to the register file simultaneously. If only one ALU could write to the register at a time, only one path would be required to traverse across the register file.

Figure 3:
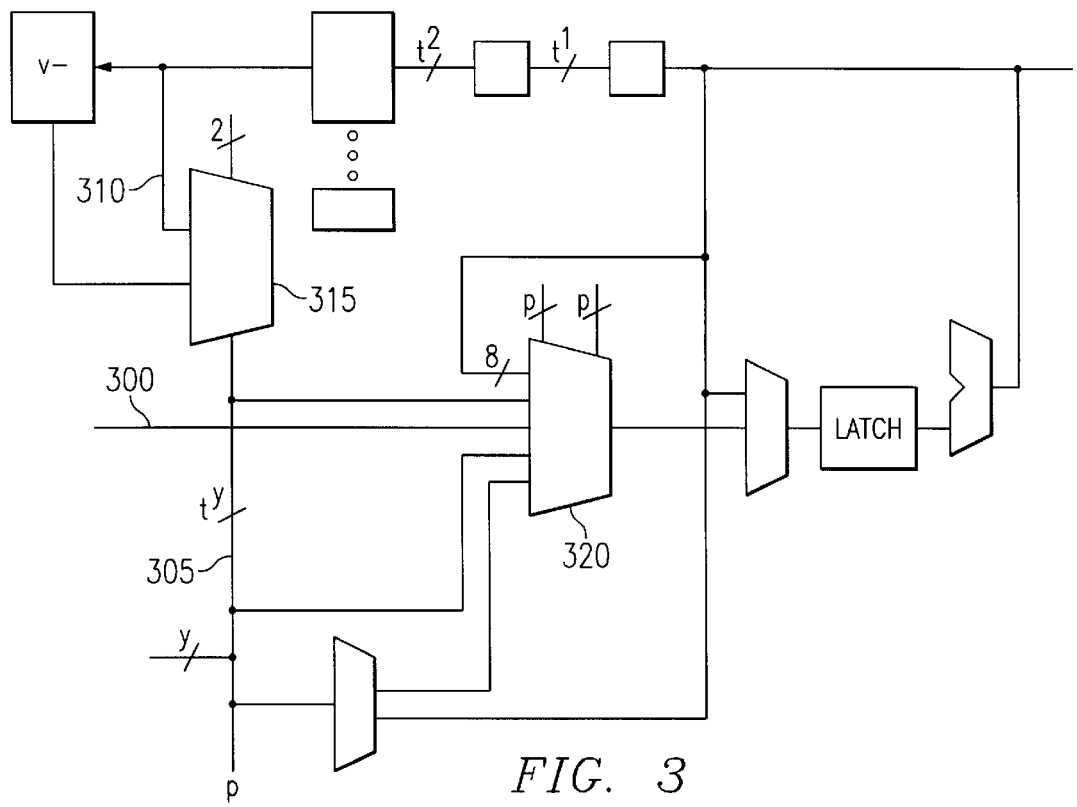
FIG. 3 shows a block diagram of a multiplexer which can be used in the implementation of FIG. 1 or FIG. 2.

FIG. 3 shows a MUX which can be used in the implementation of either FIG. 1 or FIG. 2.

Figure 4:
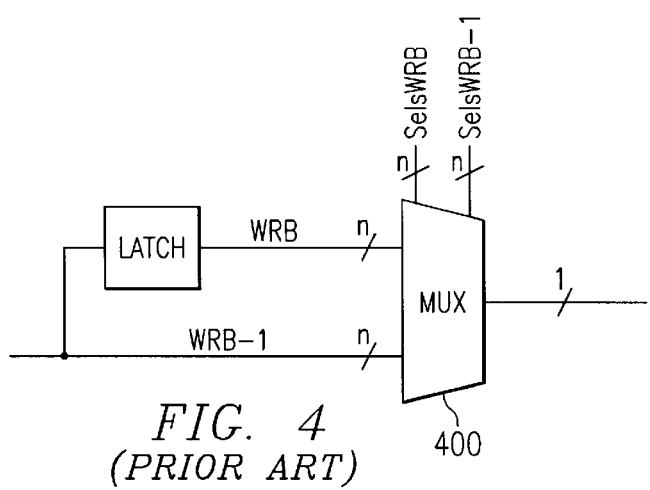
FIG. 4 shows a block diagram of a conventional multiplexer with 2N inputs and 2N selects.

FIG. 4 shows a conventional MUX, which has N inputs of data for each stage and, correspondingly, it has N selects for each stage. FIG. 4 depicts a WRB stage with N inputs and a WRB−1 stage with N inputs. This MUX has 2N inputs and consequently 2N selects.

Figure 5:
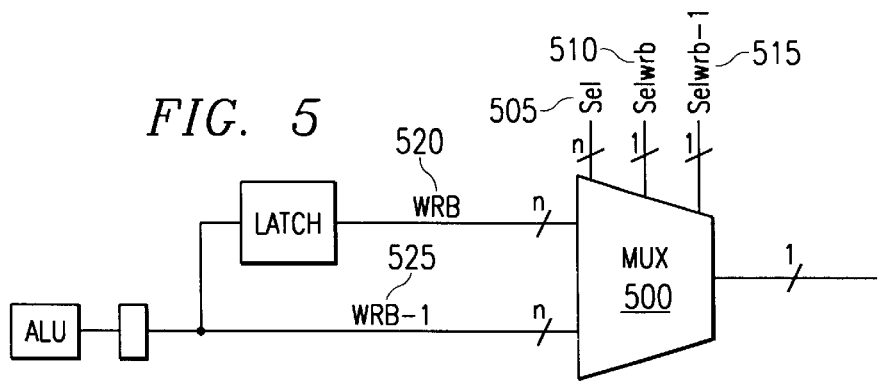
FIG. 5 shows an block diagram of an encoded multiplexer with 2N input and N+2 selects.

FIG. 5 shows a block diagram of an encoded MUX. The encoded MUX has N inputs of data for each stage. FIG. 5 depicts a WRB stage with N inputs and a WRB−1 stage with N inputs. This encoded MUX therefore has 2N data inputs. But, by using the encoded MUX, rather than a conventional MUX, the number of selects is drastically reduced. While the number of selects for the conventional MUX was 2N, the number of selects for the encoded MUX is N+2. By encoding the selects the number of selects was reduced to N selects plus two additional selects which determine which stage the data is from. In FIG. 3 WRB−1 corresponds to input 300 into MUX A 305 and WRB corresponds to input 310 into MUX B 315. Again, these last two inputs are used to determine which stage the data is from. FIG. 5 is advantageous because the circuits are wire limited and allow a reduction in the number of selects from 2N to N+2, which saves area and wiring resources. Encoded MUX 320 in FIG. 3 depicts a representative MUX.

In both FIGS. 4 and 5, the number of ALUs on a side of the register file is equivalent to N.

In order to ensure access to all computed results that have not reached a register file, a data forwarding or bypass circuit is required for each ALU input. Each of these data forwarding or bypass circuits require at least one MUX. In a typical environment, an ALU has two inputs, so the reduction in selects from 2N to N+2 in each MUX, is felt twice for a two input ALU. For ALUs with more than two inputs the savings in area and reduced complexity are significantly greater.

Figure 6:
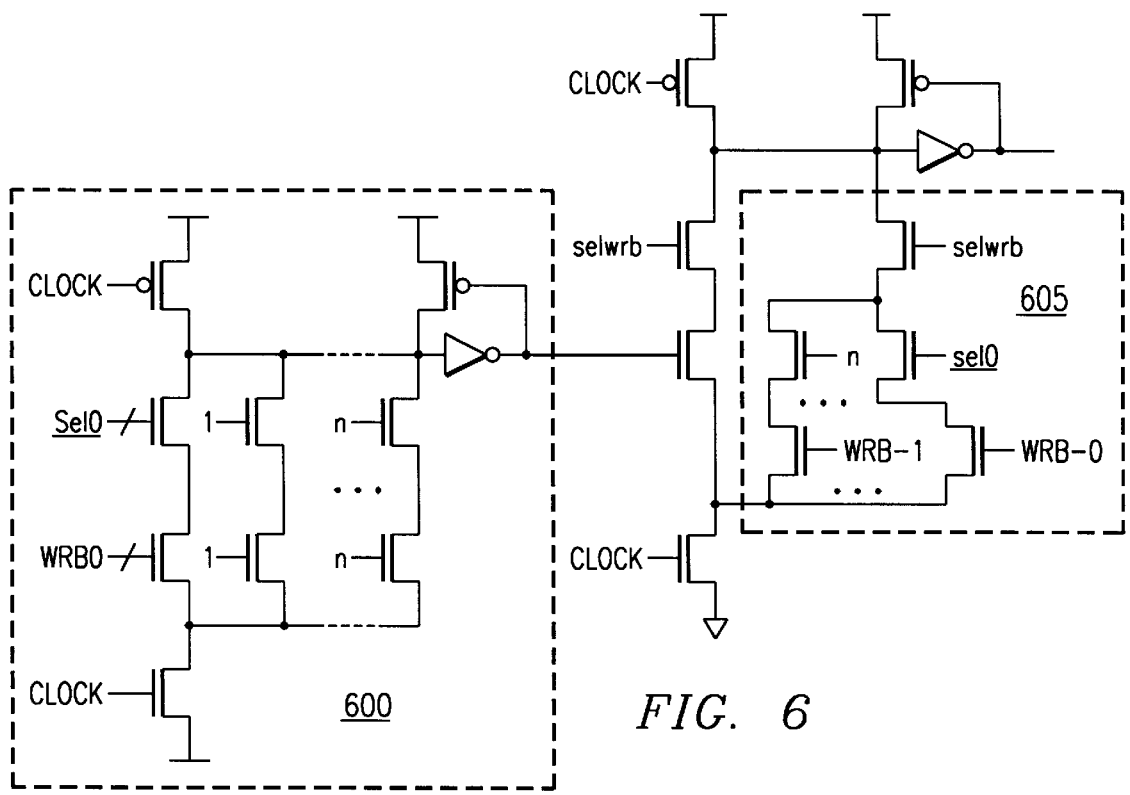
FIG. 6 shows an internal block diagram of the encoded multiplexer shown in FIG. 5.
Figure 7:
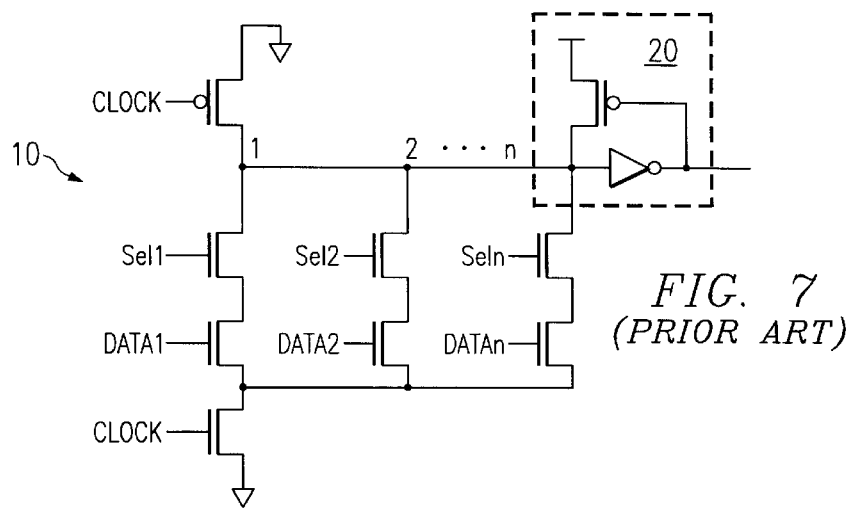
FIG. 7 shows a internal block diagram of a conventional multiplexer shown in FIG. 4.

FIG. 6 shows an internal diagram of the MUX shown in FIG. 5. FIG. 6 highlights include a WRB cone 600 that shows N inputs of WRB data and N selects going into a WRB MUX very similar to the MUX shown in FIG. 7. The output of that circuit then goes into a different circuit which contains WRB−1 cone 605, and takes the same N selects as the WRB cone 600, but also takes N inputs of WRB−1 data. Both the WRB cone 600 and the WRB−1 cone 605 use the same raw selects, labeled cell 0 through N in both cones. The WRB selects are encoded such that the select is valid if one or the other is valid but not if both are valid. In this manner the selwrb and selwrb−1 control signals are used to determine whether the system uses the output of the WRB−1 cone 605 or the WRB cone 600.

Figure 8A:
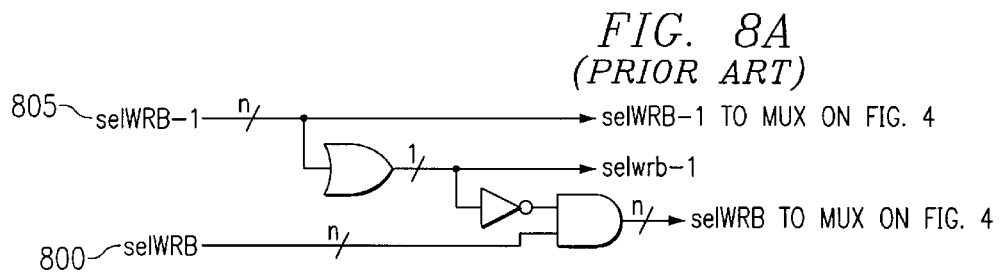
FIG. 8A shows a block diagram of a control circuits for the multiplexer shown in FIG. 4.
Figure 8B:
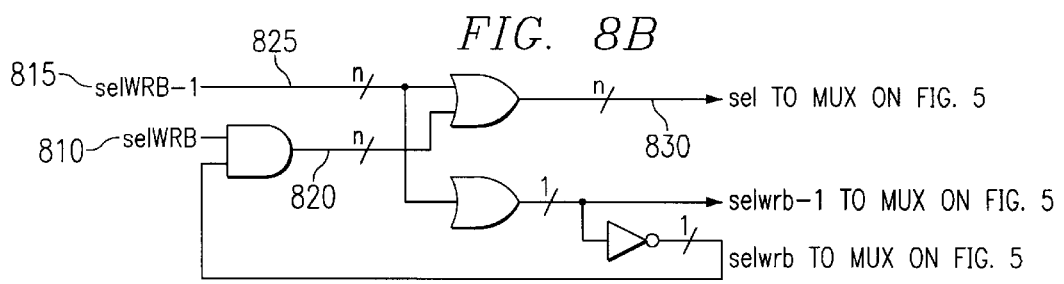
FIG. 8B shows a block diagram of the control circuits for the multiplexer shown in FIG. 5.

FIGS. 8A and 8B show how the controls are generated for the MUX 400 shown in FIG. 4 and MUX 500 shown in FIG. 5 respectively. Raw selects in FIG. 8A for both the WRB (selwrb) 800 stage and WRB−1 (selwrb−1) 805 stage are available. Before selwrb and selwrb−1 can be used with a conventional prior art MUX, they have to be conditioned and prioritized to work. This is accomplished by ensuring that selwrb−1 takes precedence. If any of the selwrb−1 are asserted, any selwrb set must be disabled. The circuit shown in FIG. 8A demonstrates one implementation of this prioritization. The prioritization between the sets ensures the exclusivity of all the selects for the MUXs in FIG. 4. The prioritization also ensures the correct priority between the stages. A total of 2N selects (N instances of selwrb and N instances of selwrb−1) are present and a delay may need to be introduced in the system to allow for the extra time required for prioritization.

FIG. 8B shows how the select lines are generated for the MUX 500 in FIG. 5. The raw selects for the WRB (selwrb) 810 stage and the raw selects for the WRB−1 (selwrb−1) 815 stage are available and are bit-wise "OR'ed" together. This reduces the two N inputs 820, 825 to a single N output 830. This combined set of selects is sent down to the MUX 500 shown in FIG. 5 and is used for the select input sel 505. Effectively what occurs is that one value from each set of data inputs on the MUX, is selected. In FIG. 5 one value from set WRB 520 and one value from set WRB−1 525 is selected.

In FIG. 8B, the N inputs of selwrb−1 815 are also "OR'ed" together and then inverted to give the two additional signals fed into the MUX 500 on FIG. 5. The "OR'ed" signal is used by MUX 500 shown in FIG. 5 as select input selwrb-1 515 and the inverted "OR'ed" signal is used by MUX 500 shown in FIG. 5 as select input selwrb 510. These inputs determine which of the two selected inputs are passed through.

The two sets of data, WRB 520 and WRB-1 525, going into the MUX 500 on FIG. 5 represent data from two different pipeline stages, or data from two different stages in a single pipeline. The vector N is used to select one from each of those pipeline stages, and then the last two signals, shown in FIG. 8B, selects between the pair that was selected from the first set. Effectively, the MUX first selects two and then selects one from those two. Finally, the selwrbs of FIG. 8 are conditioned on the fact that there was no selwrb-1. This is similar to the prioritization scheme shown in FIG. 8A.

Figure 9:
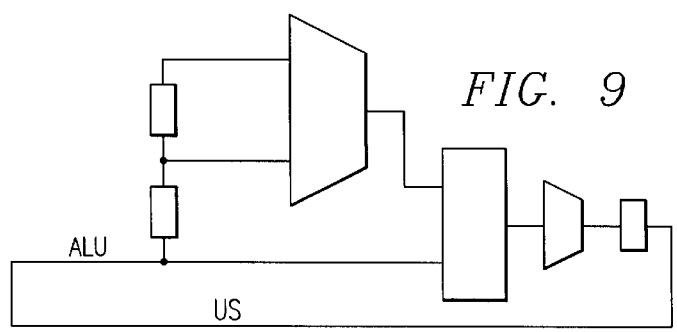
FIG. 9 shows a block diagram of a two multiplexer arrangement which accepts write back, write back minus one and the ALU output as input.

The MUX 500 of FIG. 5 is depicted as selecting between WRB and WRB-1 data. A second MUX (not shown) would be configured to choose between the output of that MUX 500 and the ALU, to ensure the data needed is available. FIG. 9 shows a representative schematic.

Figure 10:
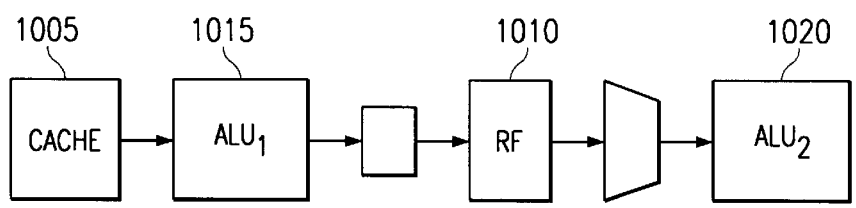
FIG. 10 shows a block diagram of an additional register file bypass and its use with a cache bypass.

FIG. 10 shows a cache bypass. The cache 1005 usually can only exist on one side of the register file 1010. Normally, the cache 1005 results are only bypassed to the ALUs which reside on the same side of the register file 1010. In FIG. 10, the cache results would be accessible to ALU1 1015, but not to ALU2 1020. Because of the mechanism described within this invention for data forwarding, existing paths across the register file 1010, previously used for data forwarding are now available to bypass the cache results across the register file to the ALUs on the off cache side. In FIG. 10, the available paths across the register file 1010 would allow the cache 1005 results to be sent to ALU2 1020.

FIG. 10 depicts one example of the additional capability available when the mechanism for data forwarding included in this invention is implemented. The implementation of this mechanism for data forwarding reduces the number of paths required to perform data forwarding and bypass. The number of MUXs required to performed data forwarding is also reduced. These reductions in the surface area used and system complexity allow for increased functionality to be added to the circuit.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A circuit to access unstored data comprising:
a register file;
a first bi-directional OR controller connected to said register file;
a first multiplexer having a first input connected to an output of said first bi-directional OR controller;
a second bi-directional OR controller connected to said register file;
a second multiplexer having a first input connected to an output of said second bi-directional OR controller;
a control circuit connected to said first bi-directional OR controller and said second bi-directional OR controller wherein said control circuit determines whether the output from said first bi-directional OR controller is sent across said register file to said second bi-directional OR controller or if the output from said second bi-directional OR controller is sent across said file register to said first bi-directional OR controller;
a first latch having an output connected to a first input of said first bi-directional OR controller;
a second latch having an output connected to a first input to said second bi-directional OR controller; and
a first functional unit having a first output connected to a second input to said first multiplexer and having a second output connected to an input to said first latch.

2. The circuit according to claim 1 further comprising:
a second functional unit having a first output connected to a second input of said second multiplexer and having a second output connected to an input of said second latch.

3. The circuit according to claim 2 wherein:
said first multiplexer is part of a first data forwarding circuit; and
said second multiplexer is part of a second data forwarding circuit.

4. The circuit according to claim 1 wherein said first bi-directional OR controller is a first bi-directional wired OR controller; and
said second bi-directional OR controller is a second bi-directional wired OR controller.

5. The circuit according to claim 3 wherein said first bi-directional OR controller is a first bi-directional wired OR controller; and
said second bi-directional OR controller is a second bi-directional wired OR controller.

6. The circuit according to claim 1 further comprising:
one or more latches between a source of unstored data and said first bi-directional OR controller.

7. The circuit according to claim 5 further comprising:
one or more latches between a source of unstored data and said second bi-directional OR controller.

8. The circuit according to claim 1 further comprising:
one or more latches between a source of unstored data and said first bi-directional controller; and
one or more latches between a source of unstored data and said second bi-directional controller.

9. The circuit according to claim 1 further comprising:
one or more additional bi-directional OR controllers having a bi-directional connection across said register file.

10. The circuit according to claim 1 further comprising:
one or more additional bi-directional OR controllers having a bi-directional connection to said first bi-directional OR controller or to said second bi-directional OR controller wherein the connection does not go across said register file.

11. An encoded multiplexer comprising:
a first input with at least one instance;
a second input with at least one instance;

a first raw select signal with at least one instance;

a second raw select signal with at least one instance; and a circuit which combines said first raw select signal and said second raw select signal to determine which input should be used as a first conditioned select signal and a second conditioned select signal wherein said circuit comprises:

an OR gate having said first raw select signal as an input;

an invertor having an input connected to an output of said OR gate; and a nand gate having a first nand input connected to an output of said invertor and a second nand input connected to said second raw select signal input.

12. The encoded multiplexer according to claim 11 wherein said first conditioned select signal is connected to said first raw select signal; and said second conditioned select signal is connected to the output of the nand gate.

13. The encoded multiplexer according to claim 12 wherein said first raw select signal is connected to the select signal from a previous cycle; and said second raw select signal is connected to the select signal from the cycle before the previous cycle.

14. An encoded multiplexer comprising:

a first input with at least one instance;

a second input with at least one instance;

a first raw select signal with at least one instance;

a second raw select signal with at least one instance; and a circuit which combines said first raw select signal and said second raw select signal to determine which input should be used as a first conditioned select signal, a second conditioned select signal, and a third conditioned select signal wherein said circuit comprises:

a first NAND gate having an input A connected to said second raw select signal;

a first OR gate having an input B connected to said first raw select signal and an input C connected to an output of said first NAND gate;

a second OR gate having an input D connected to said first raw select signal;

an invertor having an input connected to the output of said second OR gate; and said first NAND gate having an input E connected to an output of said invertor.

15. The encoded multiplexer according to claim 14 wherein said first conditioned select signal is connected to a current select signal;

said second conditioned select signal is connected to an output of said second OR gate; and said third conditioned select signal is connected to an output of said invertor.

* * * * *